United States Patent
Tang

(10) Patent No.: US 7,595,891 B2
(45) Date of Patent: Sep. 29, 2009

(54) MEASUREMENT OF THE TOP SURFACE OF AN OBJECT WITH/WITHOUT TRANSPARENT THIN FILMS IN WHITE LIGHT INTERFEROMETRY

(75) Inventor: Shouhong Tang, Tucson, AZ (US)

(73) Assignee: KLA-Tencor Corporation, Milpitas, CA (US)

( * ) Notice: Subject to any disclaimer, the term of this patent is extended or adjusted under 35 U.S.C. 154(b) by 127 days.

(21) Appl. No.: 11/177,448

(22) Filed: Jul. 9, 2005

(65) Prior Publication Data

US 2007/0008551 A1 Jan. 11, 2007

(51) Int. Cl.
*G01B 11/02* (2006.01)
(52) U.S. Cl. .................................... 356/511
(58) Field of Classification Search ................ 356/497, 356/479, 503
See application file for complete search history.

(56) References Cited

U.S. PATENT DOCUMENTS

| | | | |
|---|---|---|---|
| 5,355,221 A * | 10/1994 | Cohen et al. ............... 356/497 |
| 5,398,113 A * | 3/1995 | de Groot .................... 356/497 |
| 5,633,715 A * | 5/1997 | Ai et al. ..................... 356/497 |
| 7,102,761 B2 | 9/2006 | De Lega |
| 7,106,454 B2 | 9/2006 | De Groot |
| 7,139,081 B2 | 11/2006 | De Groot |
| 2002/0135775 A1* | 9/2002 | De Groot et al. ........... 356/497 |
| 2004/0189999 A1 | 9/2004 | De Groot |
| 2005/0057757 A1 | 3/2005 | De Lega |
| 2005/0068540 A1 | 3/2005 | De Groot |
| 2005/0073692 A1 | 4/2005 | De Groot |
| 2005/0078318 A1 | 4/2005 | De Groot |
| 2005/0078319 A1* | 4/2005 | De Groot ................... 356/497 |
| 2005/0088663 A1 | 4/2005 | De Groot |
| 2005/0280829 A1* | 12/2005 | Unruh et al. ............... 356/504 |
| 2006/0262321 A1 | 11/2006 | De Groot |
| 2007/0046953 A1 | 3/2007 | De Groot |
| 2007/0081167 A1 | 4/2007 | De Groot |
| 2007/0097380 A1 | 5/2007 | De Groot et al. |

OTHER PUBLICATIONS

"Efficient nonlinear algorithm for envelope detection in white light interferometry". K. Larkin. Optical Society of America. 1996.*
"Thickness-profile measurement of transparent thin-film layers by white-light scanning interferometry". S. Kim and G. Kim. Applied Optics. vol. 38, No. 28. Oct. 1, 1999.*
Thickness Profile Measurement . . . S. Kim & G. Kim Applied Optics, vol. 38, No. 28 (Oct. 1, 1999).
Phase Measurements . . . S. Chin & G. Kino, Applied Optics, vol. 30, No. 16 (Jun. 1, 1991).
Efficient Nonlinear Algorithm . . . K. Larkin Optical Society of America 1966.
Detrmination of Fringe Order . . . P. de Groot et. al. Applied Optics, vol. 41, No. 22, (Aug. 1, 2002).
Offset of Coherent Envelope . . . , A. Harasaki et al. Applied Optics, vol. 40, No. 13, (May 1, 2001).
Wauelet Transform . . . P. Sandoz, 1997 Optical Society of America.
An Interferometric Profiler . . . , P. Calier, Wkfko Corp.

* cited by examiner

*Primary Examiner*—Tarifur Chowdhury
*Assistant Examiner*—Jonathan M Hansen
(74) *Attorney, Agent, or Firm*—Luedeka, Neely & Graham, P.C.

(57) ABSTRACT

White light interferometry is used to obtain the height information of the topmost surface of an object having a transparent thin film on it. N frames of data are acquired from an interferometer while a white light fringe pattern is scanning through a field of view. The modulation fringe envelope R(n) is calculated for every pixel; and the topmost surface position at every pixel is determined as an offset of R(n).

6 Claims, 11 Drawing Sheets

MEASUREMENT OF THE TOP SURFACE OF AN OBJECT WITH/WITHOUT TRANSPARENT THIN FILMS IN WHITE LIGHT INTERFEROMETRY

BACKGROUND

This invention is related to the field of white light interferometry or vertical scanning phase-shift interferometry. White light interferometry (WLI) is a technique that uses an interferometer to profile surfaces. A set of intensity frames is acquired from a test surface sequentially by changing the optical path difference (OPD) between the test surface and a reference surface. Either the test surface or the reference surface may be moved with respect to one another to effect this change. With a spectrally broad band or white light illumination, the temporal intensity distribution recorded at each pixel in the intensity frame in WLI has a localized interferogram whose contrast is a maximum at OPD=0, decreases rapidly as OPD increases, and diminishes at OPD greater than the coherence length of illumination.

Although most commercial interferometers using WLI are capable of measuring surfaces with nanometer precision, the technique has been used to profile opaque surfaces or surfaces without a transparent thin film on them. The reason for this is that multiple reflections produced from a test surface with transparent thin films create multiple superimposed interferograms. As a result, known methods in WLI lose the ability to profile surfaces with such superimposed interferograms.

SUMMARY OF THE INVENTION

This invention is directed to a method for measuring the top surface of an object with single or multiple transparent thin films on all or parts of the measuring area using WLI.

DETAILED DESCRIPTION

Figure 1:
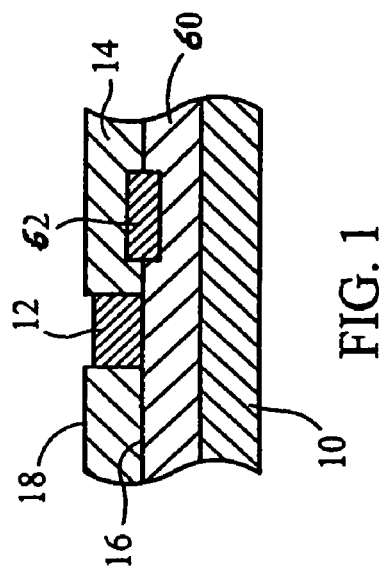
FIG. 1 is a diagrammatic cross section of a representative, surface covered with a transparent thin film.

Reference now should be made to the drawings, in which the same reference numbers are used throughout the different figures to designate the same or similar components. FIG. 1 is a cross section of a portion of a test surface or objective where the measuring surface is covered with a transparent layer of a thin film. FIG. 1 is representative of an objective which may be of a variety of different types including, but not limited to, a CMP pattern wafer 70. Such a wafer includes a substrate 10 on which metallization regions, such as the patterns 12 and 62, are located. The top surface of the pattern 12 is exposed. As illustrated in FIG. 1, a thin transparent film 14 is located over much of the entire surface of the wafer 70, with the uppermost or top surface position 18 located higher than the metallization regions 12, and with a second reflective surface 16 at the boundary between the thin film 14 and the region 60. It also should be noted that for some applications, such as shown in FIG. 1, the thin film 14 may not be located over the entire objective. In these regions with no thin film 14, the top surfaces of the metal portions 12 constitute the topmost surface.

Figure 2:
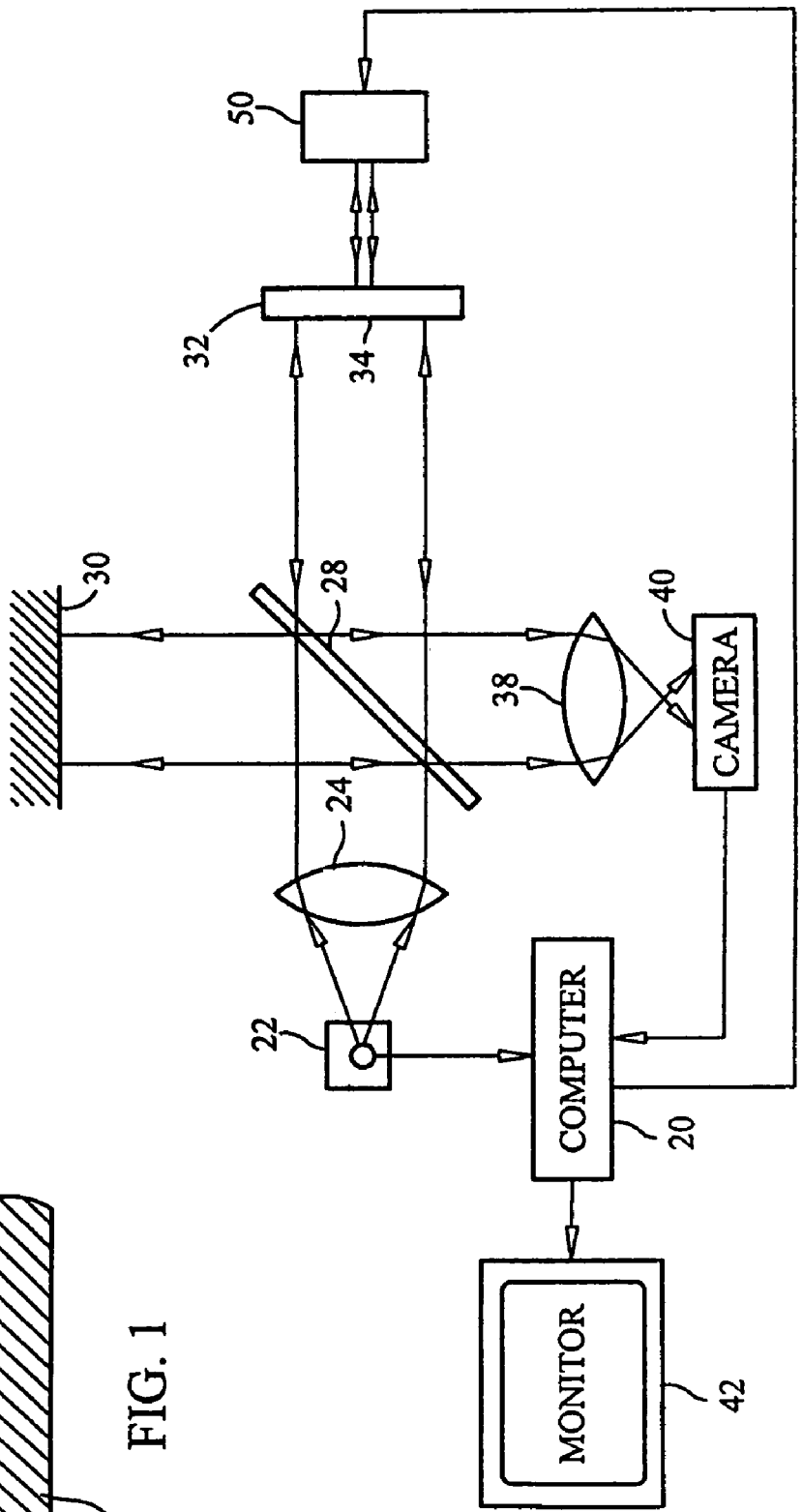
FIGS. 2, 3, 4 and 5 are schematic diagrams of different interferometers used in practicing embodiments of the invention.

FIG. 2 is a schematic diagram of a Twyman-Green interferometer system which may be used in conjunction with the practice of the method of this invention. As shown in FIG. 2, the interferometer is controlled by a computer 20, which coordinates the operation of a white light or incoherent light source 22 with other components of the system. The white light from the source 22 is supplied through a collimating lens 24 to a beam splitter 28, from which the light is separated into two paths, one to a reference flat 30 and the other to the measurement object or test piece 32.

The reflected light beams from both the topmost surface 34 and underneath surfaces of the test piece 32 (where a transparent thin film or multiple transparent thin, films of the type shown in FIG. 1 are involved) are directed by the beam splitter 28 to an imaging lens 38, which supplies, simultaneously, multiple interferograms to a CCD camera 40 or other suitable recording plane. The camera 40 additionally may include a frame grabber (not shown) for storing images detected by the camera; or the computer 20 may be configured to provide this function. In any event, the images obtained by the camera 40 are supplied to the computer 20 for processing to produce the desired profiles in a suitable form for immediate display on a TV monitor 42, or for storage for subsequent utilization.

The step-by-step positioning for each frame of analysis is effected by the computer 20 in synchronization with the operation of the camera 40 by means of a suitable pusher or drive mechanism 50. The pusher 50 is illustrated in each of FIGS. 2, 3, 4 and 5 as moving the object 32 toward and away from the reference flat 30. A Piezo-electric pusher, pneumatic pusher or other suitable mechanical pusher may be employed for this purpose.

It should be noted that instead of moving the test piece or object 32 with respect to the reference flat 30, the pusher 50 could be mechanically coupled (by a coupling not shown) to the reference flat 30 to move that surface relative to the surfaces of the test piece 32. Either the object/test piece 32 or the reference surface 30 may be moved in parallel planes with respect to one another to produce the repeated measurements or vertical scanning for each of the positions over which the complete scan is made. As is well known, the use of WLI allows the entire image field to be captured in one instant without the need for scanning apertures, resulting in profiling with high accuracy over a large range.

Figure 3:
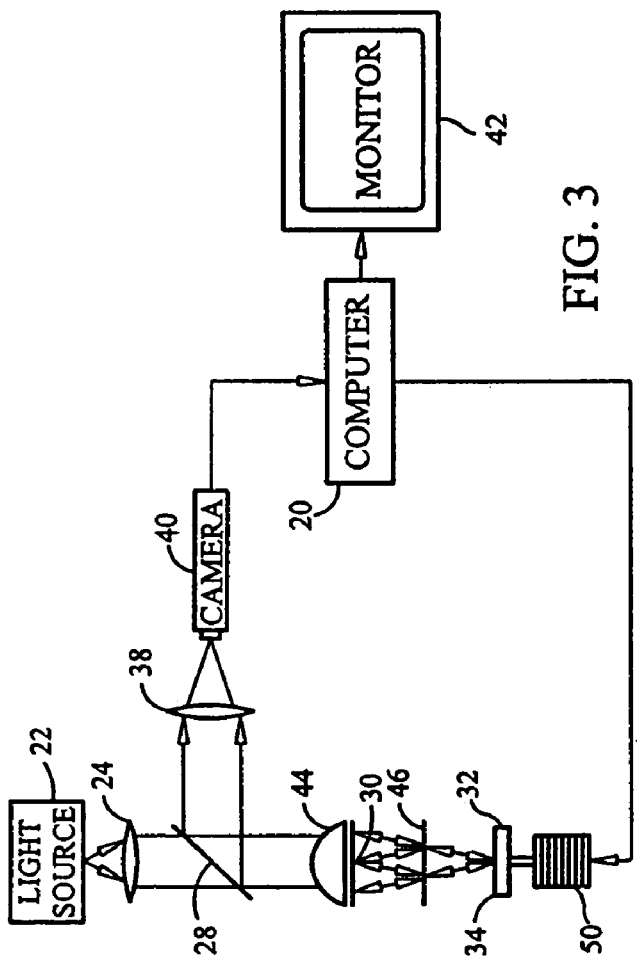
Figure 4:
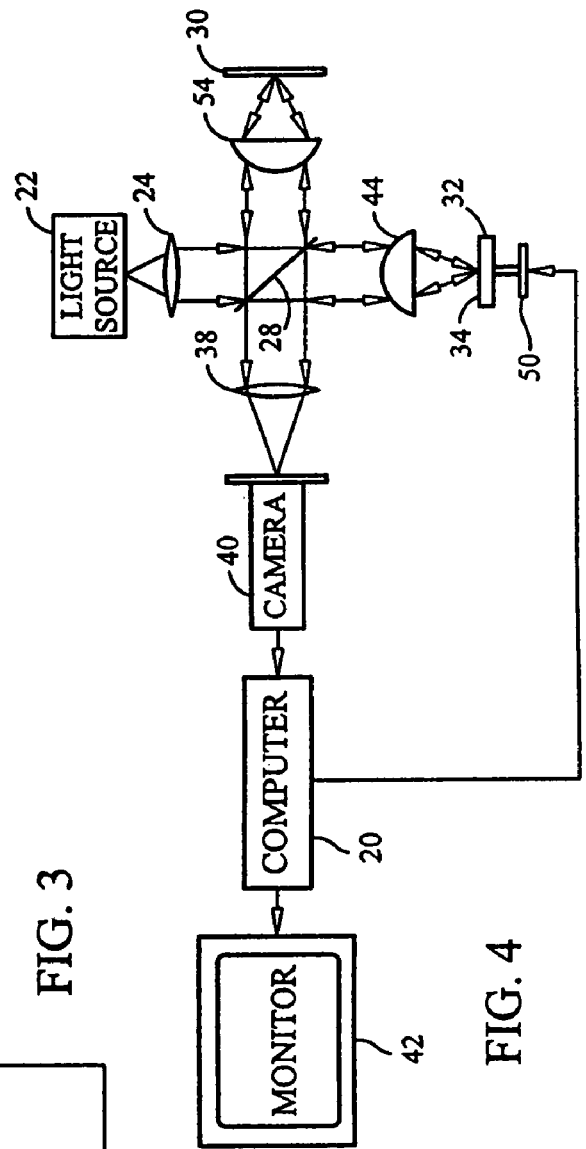

The method of this invention may be practiced with a variety of different interferometric systems. FIGS. 3 and 4 are directed to Mirau and Linnik interferometers, respectively, configured in accordance with the overall configuration described above for the Twyman-Green interferometer of FIG. 2. Those components which are the same in the interferometers of FIGS. 3 and 4 and which have correspondence with the same elements in the interferometer of FIG. 2 are provided with the same reference numbers in both FIGS. 3 and 4. Again, the computer 20 controls the operation of the system by coordinating the frames or images captured by the camera 40 with the movement of the object 32 by the pusher 50.

In the Mirau interferometer of FIG. 3, an objective lens 44 receives the collimated light from the beam splitter 28 and supplies that light to a reference flat in the form of a reference mirror 30 and a further beam splitter 46 in accordance with the conventional operation of such an interferometer. The manner of capturing the WLI images by the camera 40 and the computer 20 is otherwise substantially the same as that described above in conjunction with the Twyman-Green interferometer of FIG. 2.

FIG. 4 illustrates a Linnik interferometer system which may be used in conjunction with the method of this invention. As is known, a Linnik interferometer uses identical microscope objective lenses, with the lens 44 being duplicated by another lens 54 provided with inputs from the beam splitter 28. The lens 54 then focuses on a reference flat (mirror) 30, whereas the lens 44 is used to focus on the object 32. The reflected images are gathered and supplied by the beam splitter 28 to the imaging lens 38 for the camera 40. The computer 20 then processes the information in substantially the same manner as for the Mirau and Twyman-Green interferometers circuits described previously. It also should be noted that another interferometer which is somewhat similar to the Mirau and Linnik interferometers is the Michelson interferometer (not shown); and such an interferometer also could be used in conjunction with the practice of the method of this invention.

Figure 5:
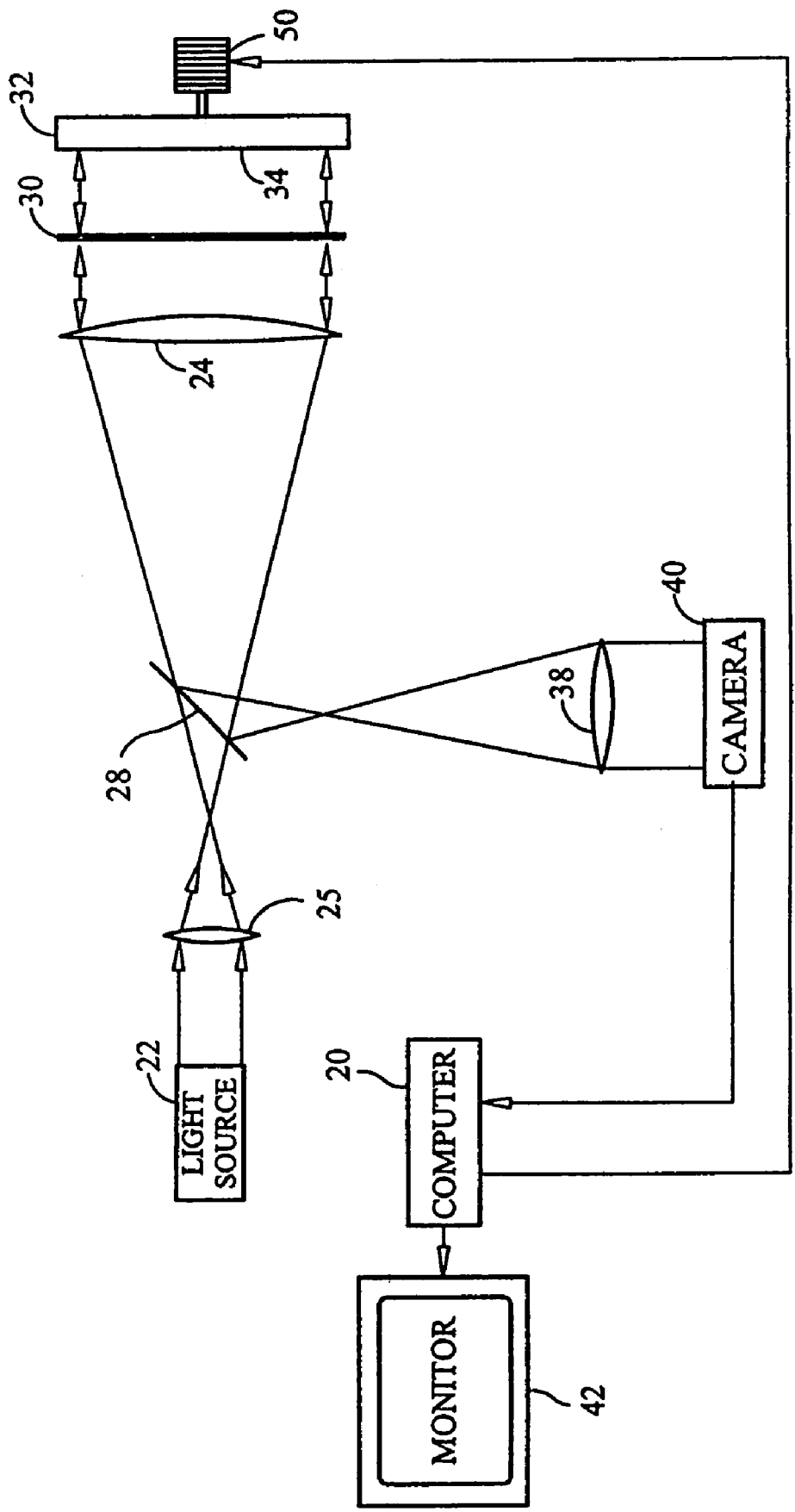

FIG. 5 is a schematic diagram of a Fizeau interferometer used in conjunction with the practice of the invention. As with the interferometers described previously, the computer 20 controls the position of the object or test piece 32, relative to a reference flat 30, by means of a mechanical pusher 50. It should be noted that the various components of the Fizeau interferometer of FIG. 5 and those of the Twyman-Green interferometer of FIG. 2 are substantially the same. It should be noted, however, that in the system shown in FIG. 5, the output of the light from the white light source 22 is supplied through a focusing lens 25, which then supplies the light to the beam splitter 28, from which light is supplied to the collimating lens 24 to provide collimated light for the reference flat 30 and surface 34 of the test piece 32.

All of the four different interferometer systems-which are described above in conjunction with FIGS. 2, 3, 4 and 5, as well as other interferometer systems (such as the Michelson interferometer mentioned above), may be used in conjunction with the practice of the method of this invention. All of these interferometers are operated with a white light source 22, as described previously, and vertical scanning (parallel) or vertical positioning of the object 32 relative to a reference flat 30 is utilized for measuring the intensity of each pixel in the scan.

In white light interferometry, a temporal intensity distribution $I(z)$ is defined as a series of intensities recorded at a single pixel in a series of intensity frames. The pixel is representative of a specific location on a measuring surface. The series of intensity frames comprises set of temporal samples of white light phase shifting interferometry data that is acquired from a measuring surface at selected positions of the measuring surface relative to a reference surface. $I(z)$ can be expressed as:

$$I(z) = \int_0^\infty F(k)\left(1 + \int_0^{\theta_0} \cos(2k\cos\theta(z-h) + \phi(k))\sin\theta\cos\theta \, d\theta\right) dk, \quad (1)$$

where z is the distance of the reflecting point from the focus, h, is the distance of the reference mirror from the focus, k is the wavenumber, $\theta_0$ is related to the numerical aperture of the objective or N.A.=$\sin\theta_0$, $\phi(k)$ is the reflectance phase of the measuring surface 32, and $F(k)=S(k)R(k)$ where $S(k)$ is the spectrum of white light illumination and $R(k)$ is the reflectance of the measuring surface.

For a measuring surface without a transparent thin film on the top, it may be rewritten as:

$$I(n) = \alpha + m(n-\tau)\cos(\phi + \omega_s n), \text{ for } n = 0, 1, 2, \ldots, N-1 \quad (2)$$

Where a is the background intensity, N is the total number of temporal intensity samples, m is the function representing the fringe modulation or envelope for the subject pixel of the sample, $\tau$ is the position effected by means of the pusher 50 producing the temporal sample intensity frame having the peak of the intensity envelope, n is the position effected by means of the pusher 50 to produce the selected temporal sample intensity frame, also known as the frame number, $\bar{\omega}_s$ is the phase shift, and $\phi$ carries the height information of the measuring surfaces. Thus, when n=$\tau$, the modulation is maximum.

Figure 6:
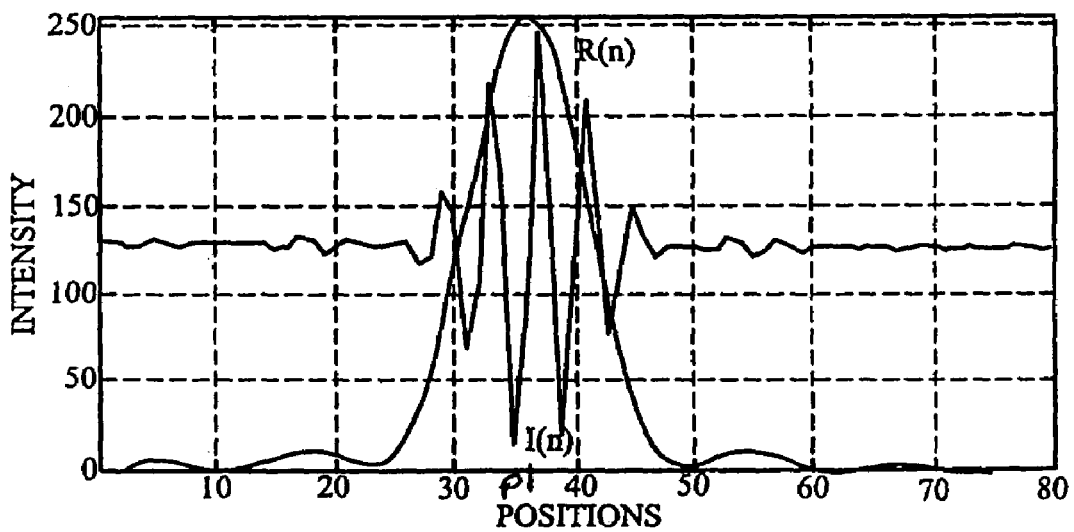
FIG. 6 is a temporal intensity distribution diagram for a pixel of a measuring surface without a transparent thin film on it.

A typical temporal intensity distribution of Equation (2) is depicted in FIG. 6. In FIG. 6, the intensity is shown on the left-hand or y scale in relative terms, which may be grey levels. The different positions effected by means of the pusher 50 in the interferometer (the frame numbers) are indicated across the scale at the bottom of FIG. 6. It should be noted that a temporal intensity distribution I(n) of the type shown in FIG. 6 is obtained for each pixel in a representative intensity frame acquired using the white-light interferometer. In FIG. 6, R(n) is the function representing the overall modulation envelope of I(n). A number of different algorithms have been developed to extract the phase $\phi$ from a set of intensities described in Equation (2). A general expression for these phase-shifting algorithm is:

$$\Phi(n) = \tan^{-1}\frac{\sum_1^M s_i I\left(n - \frac{M}{2} + i\right)}{\sum_1^M c_i I\left(n - \frac{M}{2} + i\right)} = \tan^{-1}\frac{R(n)\sin(\phi + \omega_s n)}{R(n)\cos(\phi + \omega_s n)}. \quad (3)$$

Where $s_i$ and $c_i$ are the weights for the sampling intensity at the i-th frame. When $R(n) \propto$ the fringe modulation m, R(n) may be expressed as:

$$R(n) = \sqrt{\left(\sum_1^M s_i I\left(n - \frac{M}{2} + i\right)\right)^2 + \left(\sum_1^M c_i I\left(n - \frac{M}{2} + i\right)\right)^2} \quad (4)$$
$$\approx Cm(n-\tau),$$

M is the number frames used in the algorithm and C is a constant that depends on the phase shifting algorithm used.

Any one of several different known phase shifting algorithms can be used in conjunction with the method of this invention. By way of example, if a Hariharan 5 frame phase-shifting algorithm is used, $s_i$ and $c_i$ are:

$s_1=0, s_2=2, s_3=0, s_4=-2, s_5=0;$ $c_1=-1, c_2=0, c_3=2, c_4=0, c_5=-1;$

For this algorithm, the constant C is close to 4 and Equation (3) and Equation (4) become:

$$\Phi(n) = \tan^{-1} \frac{2I(n-1) - 2I(n+1)}{2I(n) - I(n-2) - I(n+2)}. \quad (5)$$

$$R(n) = \sqrt{\frac{(2I(n-1) - 2I(n+1))^2 +}{(2I(n) - I(n-2) - I(n+2))^2}}. \quad (6)$$

Once $\Phi(n)$ is found, the desired phase $\phi$ can be obtained in Equation (3) as long as $R(n) \neq 0$. In other words, it is not necessary to achieve the surface height information $\phi$ by selecting $\Phi(n)$ where $R(n)$ is the maximum.

Other phase shifting algorithms also exist with different expressions to calculate $\Phi(n)$ and $R(n)$, such as least squares, Fourier transforms, and others. They also can be used in this invention.

For a measuring surface with multilayer transparent thin films on the top, Equation (1) may be rewritten as:

$$I(n) = a + \sum_{k=1}^{K} m_k(n - \tau_k) \cos(\phi_k + \omega_s n) \quad (7)$$

for $n = 0, 1, 2, \ldots, N - 1$.

Where a is the background intensity, N is the total number of temporal samples, K is the total number of reflective-surfaces, K is one of the reflective surfaces, $m_k(n)$ is the function representing the envelope for the temporal fringe related to k-th reflective surface only, $\tau_k$ is the position of the envelope peak of the K-th reflective surface, n is the sampling position or frame number, $\omega_s$ is the phase shift, and $\phi_k$ carries the height information related to k-th reflective surfaces only. A typical temporal intensity distribution I(n), and its associated overall modulation envelope R(n) for this type of measuring surface is depicted in FIG. 7.

Figure 7:
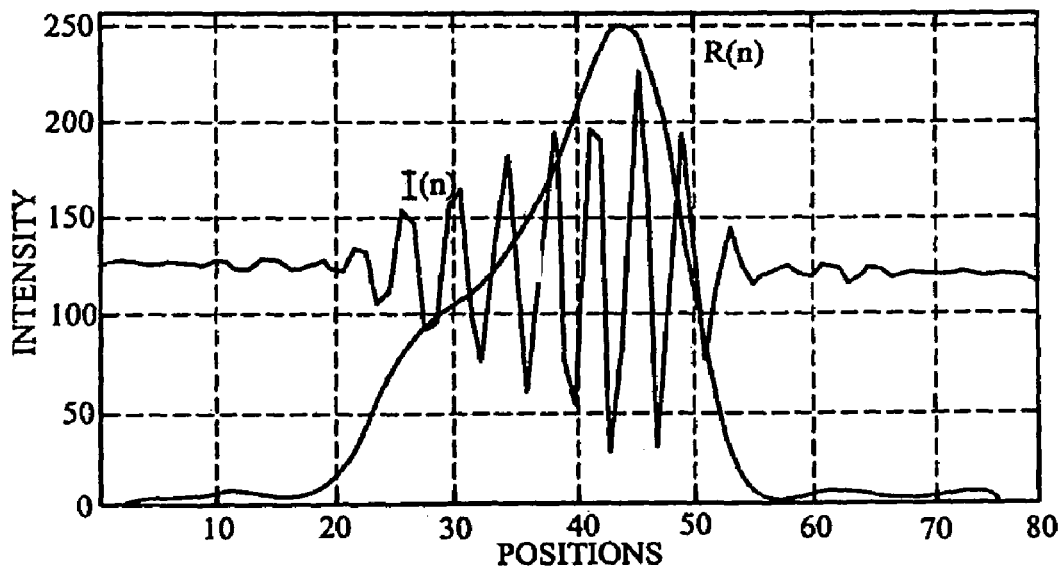
FIG. 7 is a temporal intensity distribution diagram for a pixel of a measuring surface with multiple transparent thin films on it.

As can be seen by comparison of FIGS. 6 and 7, the temporal intensity distribution for measuring a surface with multiple transparent films using WLI results in a more complex distribution for each pixel, resulting in greater difficulty in determining the top surface contributions.

Substituting Equation (7) into Equation (3) or Equation (5) gives:

$$\Phi(n) = \tan^{-1} \frac{\sum_{k=1}^{K} R_k(n) \sin \Phi_k(n)}{\sum_{k=1}^{K} R_k(n) \cos \Phi_k(n)} \quad (8)$$

Substituting Equation (7) into Equation (4) or Equation (6) gives:

$$R(n) = \sqrt{\left(\sum_{k=1}^{K} R_k(n) \cos \Phi_k(n)\right)^2 + \left(\sum_{k=1}^{K} R_k(n) \sin \Phi_k(n)\right)^2} \quad (9)$$

The top surface phase, say $\Phi_1(n)$, may be, found if there exists a temporal position $n_c$ such that:

$$\sum_{k=2}^{k} R_k(n_c) \sin \Phi_k(n_c) = \sum_{k=2}^{K} R_k(n_c) \cos \Phi_k(n_c) \quad (10)$$

$$= 0 \text{ and } R_1(n_c)$$

$$\neq 0.$$

Thus, the phase $\Phi(n_c)$ calculated by Equation (8) is equal to $\Phi_1(n_c)$. Consequently, the top surface $m_1$ height information related to $\Phi_1$ is achieved. With a similar approach, the surface height or phase of any other underneath surfaces $m_2$, $m_3$, $m_4$ . . . may be found, for example, $\Phi_m(n_c)$, if there exists a temporal position $n_c$ such that:

$$\Sigma R_k(n_c) \sin \Phi_k(n_c) = \Sigma R_k(n_c) \cos \Phi_k(n_c) = 0 \text{ for all } k$$
except $k = m$.

Where m is a reflective surface in which the expression of Equation 11 is non-zero, such a desired temporal top surface position $n_c$ exists for each pixel in various applications. It should be noted that the desired position $n_c$ for measuring the surface with transparent thin films may be neither at the maximum position of R(n), nor at the first local maximum of R(n). This is illustrated in FIGS. 8A, 8B and 8C, all of which show intensity distributions for a pixel and their associated envelopes.

Figure 8A:
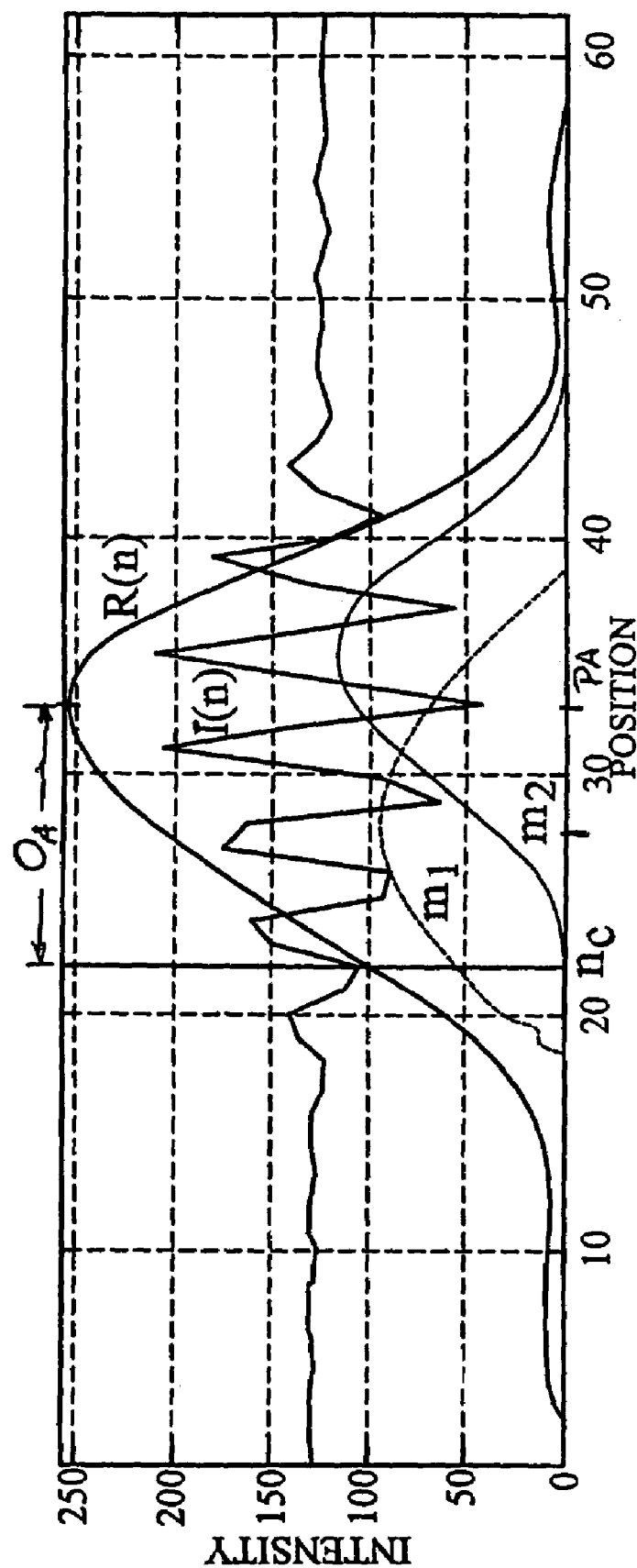
FIGS. 8A through 8C are temporal intensity distribution diagrams useful in describing the method of the invention.
Figure 8B:
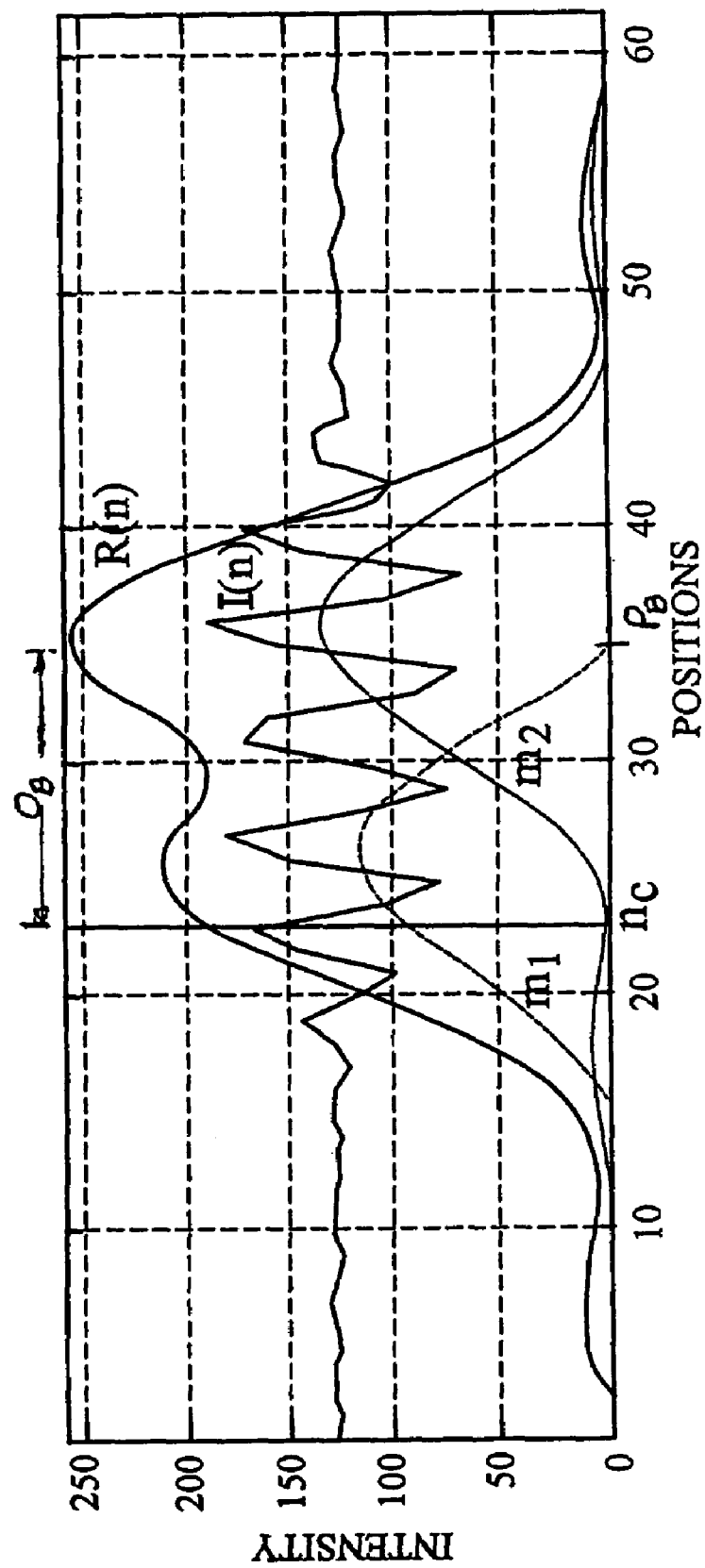
Figure 8C:
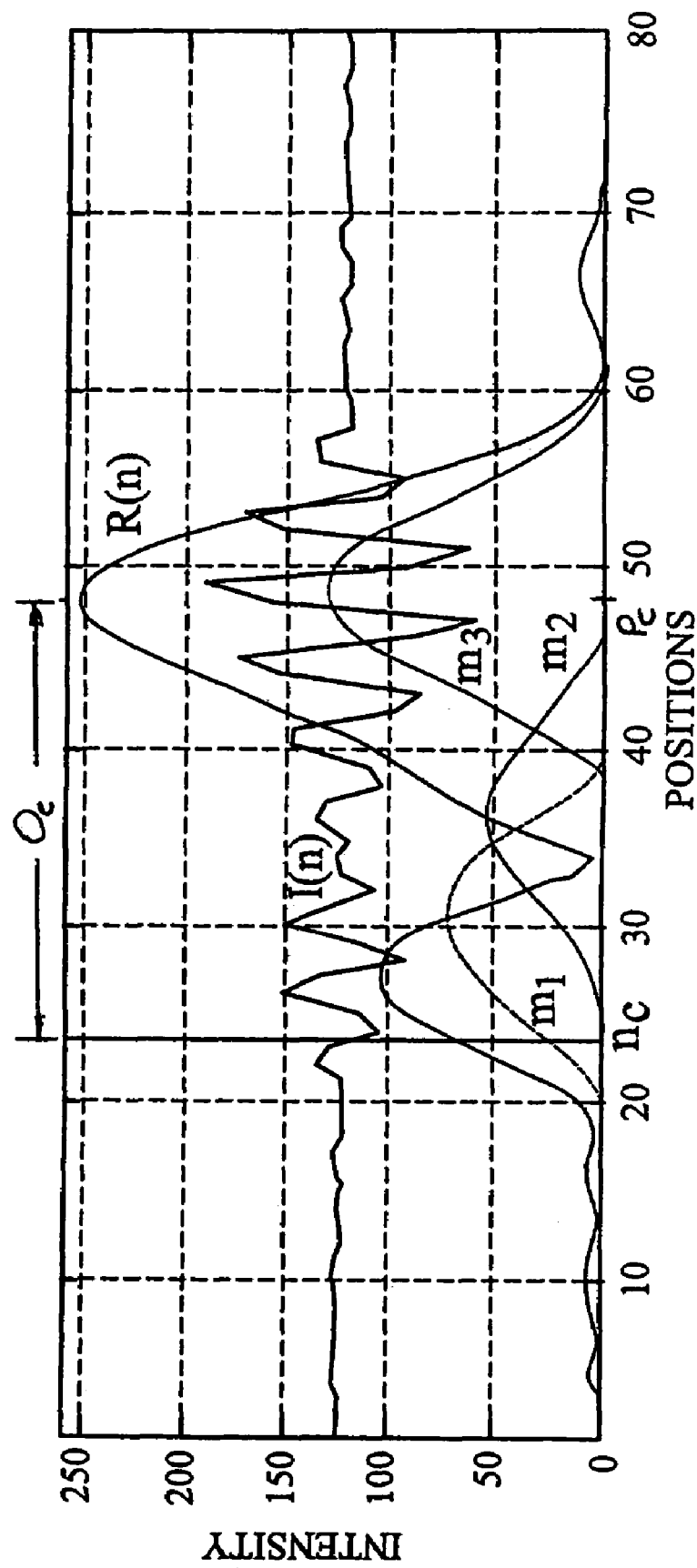

FIG. 8A is for a surface which has one layer of transparent film with two reflective surfaces $m_1$, $m_2$. FIG. 8B is for a structure similar to the one in FIG. 8A, with a single layer of transparent film with two reflective surfaces $m_1$, $m_2$ FIG. 8C is for a structure which has two layers of transparent film providing three reflective surfaces $m_1$, $m_2$, $m_3$. The situations depicted in FIGS. 8A, 8B, and 8C are different; but each one is directed to a single pixel.

Figure 9:
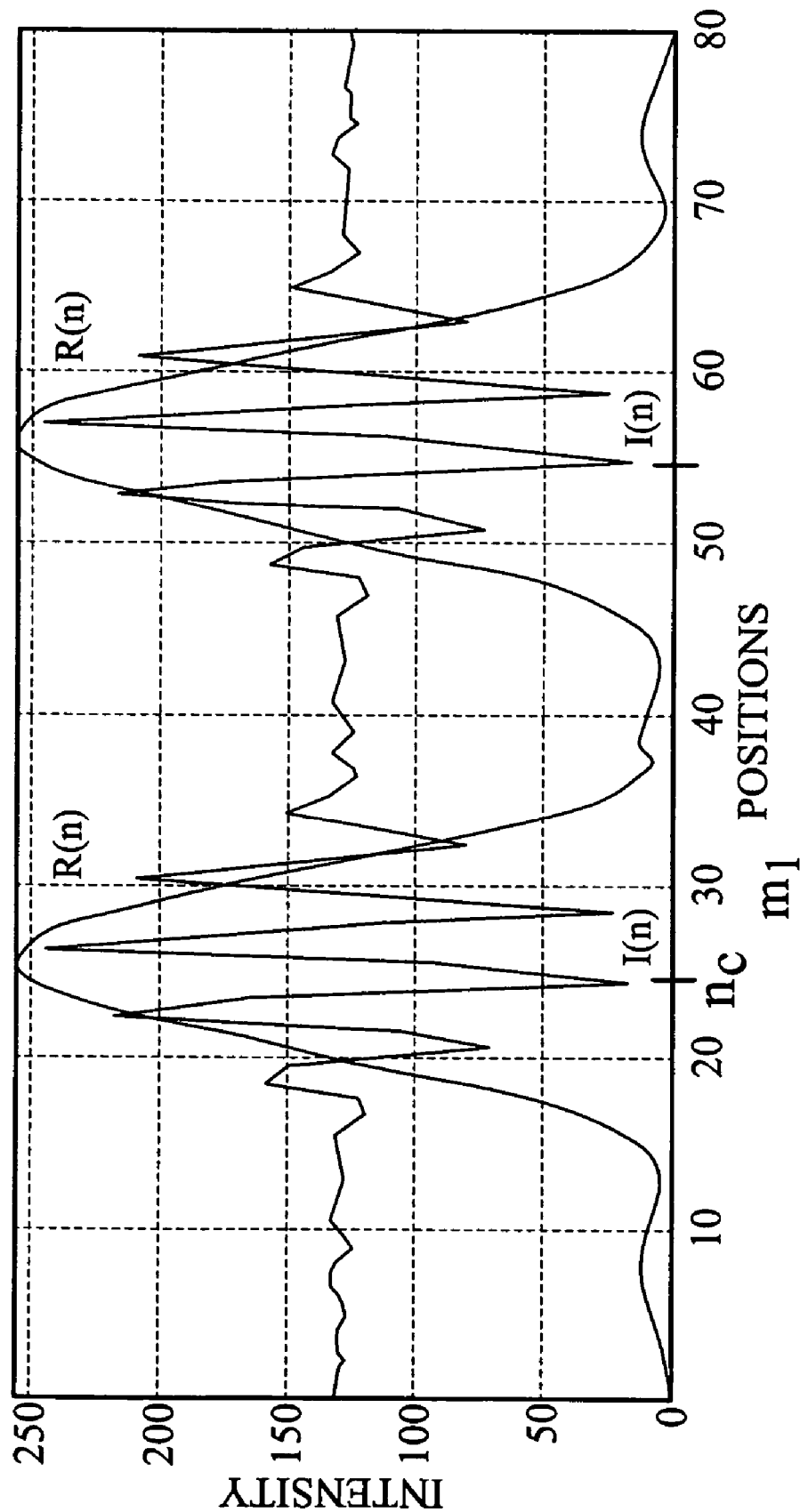
FIG. 9 is a temporal intensity distribution diagram for a pixel of a measuring surface with one layer of relatively thicker transparent film with two reflective surfaces.

When all or part of the measuring surface has one or more transparent layers of thin films, and where the top layer or thin film is thick, the amplitude peaks of the fringe envelope related to different reflective surfaces are well separated. An example of this is shown in FIG. 9. In such a situation, the calculating position no may be determined in the same manner as for a measuring surface without a thin transparent film, such as the surface depicted in FIG. 8.

In the example of a measuring surface without a thin transparent film as shown in FIG. 6, the calculating position $n_c$ is determined to be the position of the measuring surface relative to the reference surface where the fringe envelope R(n) is at a maximum, i.e. where the fringe envelope R(n) has an amplitude peak.

FIG. 9 shows the temporal intensity distribution for a pixel of a measuring surface with one layer of relatively thicker transparent film with two reflective surfaces $m_1$, $m_2$. Generally, thin films are measured in nanometers, but they could be as thick as to be measured in microns. For wafers with such relatively thicker films, the fringe envelope for the first reflective surface $m_1$ is proportional to the fringe envelope R(n) at the first amplitude peak of R(n), and is zero elsewhere. Similarly, the fringe envelope for the second reflective surface $m_2$ is proportional to R(n) at the second amplitude peak of R(n) and is zero elsewhere.

For a measuring surface with one layer of relatively thicker transparent film with two reflective surfaces, $m_1$, $m_2$, the calculating position $n_c$ is found at the maximum amplitude peak of R(n). If, as shown in FIG. 9, the amplitude peaks are equal and not one amplitude peak is a maximum, $n_c$ may be found at the first position of the measuring surface relative to the reference surface in which R(n) has an amplitude peak. Alternatively, $n_c$ may be found at the first position of the measuring surface relative to the reference surface in which R(n) has an amplitude peak above a threshold value. The threshold value may be a constant; or it may be determined dynamically according to the maximum R(n) at each pixel.

For purposes of illustration, the threshold value in the diagram of FIG. 9 is set at an intensity of 100, and the first amplitude peak for R(n) which exceeds an intensity of 100 is located at approximately position 25. Therefore, $n_c$ is found at approximately position 25.

When all or part of the measuring surface has one or more transparent layers of thin films, and where the amplitude peaks of the fringe envelope related to different reflective surfaces are not well separated, such as the surfaces represented by FIGS. 8A, 8B and 8C, the calculating position $n_c$ may be determined by finding the first position that is offset from an amplitude peak R(n) by an offset O.

The offset from R(n) may be determined using an algorithm which is a function of the known characteristics of the transparent thin films of the sample being measured, properties of the top surface of the sample, envelope fringes, or the phase under the fringe envelope.

One way to determine n, as an offset from an amplitude peak R(n) is to determine the phase $\Phi(n)$ in accordance with a phase shifting algorithm such as shown in Equation 3, and select $n_c$ at a minimum or maximum of the phase $\Phi(n)$ within the fringe envelope R(n).

Figure 10:
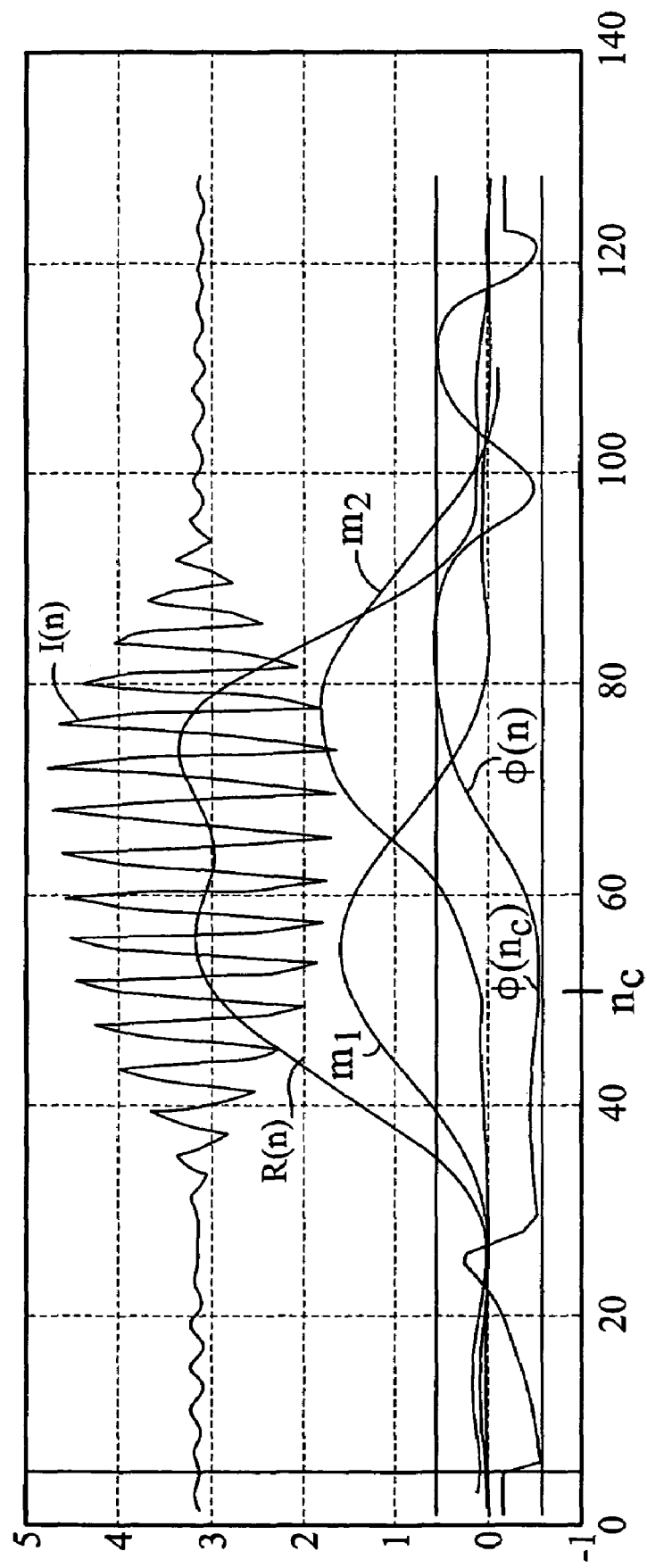
FIGS. 10 and 11 re temporal intensity distribution diagrams useful in describing embodiments of the invention.
Figure 11:
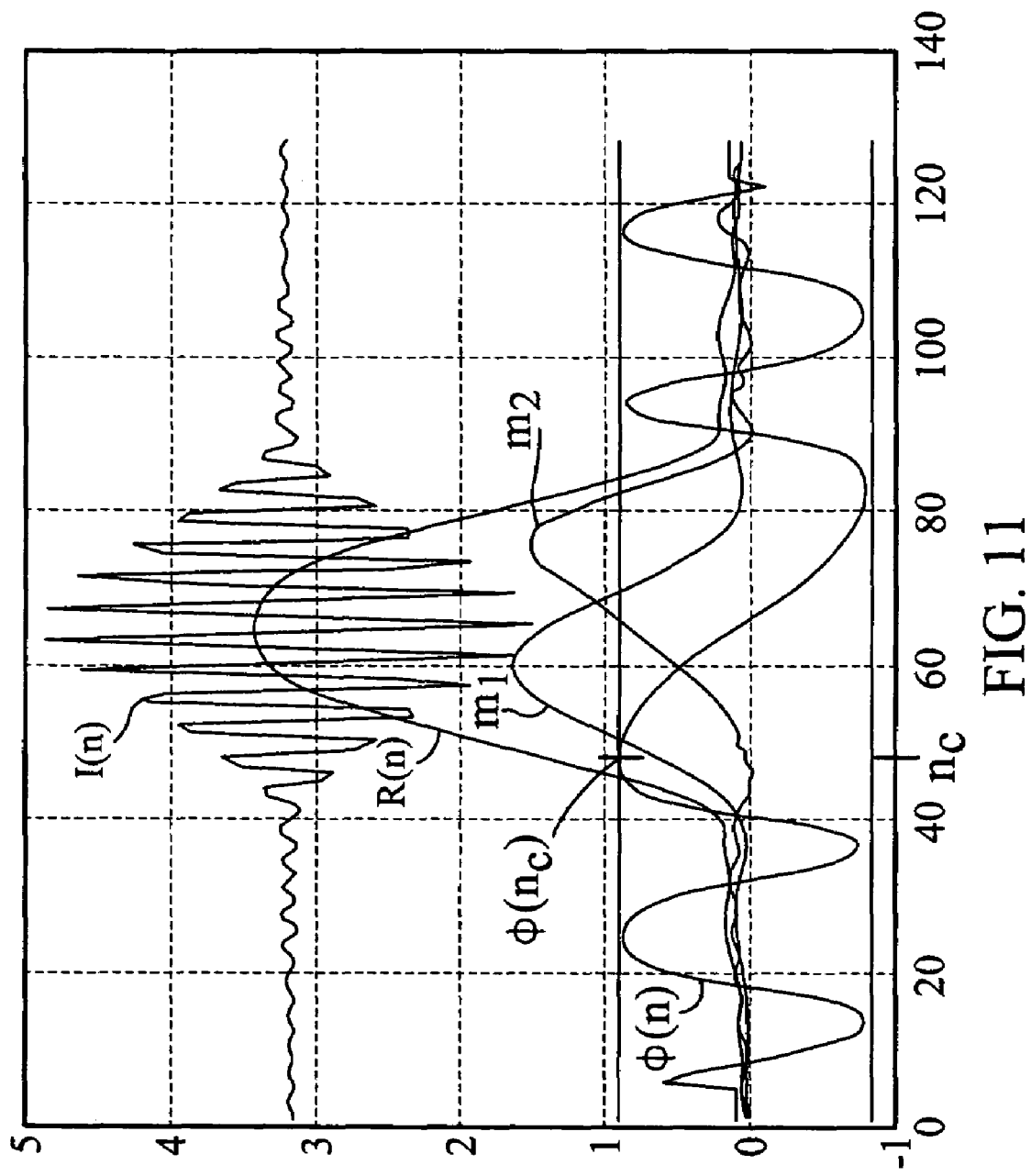

FIG. 10 shows a temporal intensity distribution in which $n_c$ is found at the position in which the phase $\Phi(n)$ is at a minimum within the fringe envelope R(n). FIG. 11 shows a temporal intensity distribution in which $n_c$ is found at the position in which the phase $\Phi(n)$ is at a maximum within the fringe envelope R(n).

As can be seen in both FIGS. 10 and 11, there are several positions in which the phase $\Phi(n)$ can be found to have a minimum or a maximum, but the location of $n_c$ is found to be at the location where R(n) is non-zero. Alternatively, the several positions in which the phase $\Phi(n)$ can be found to have a minimum or a maximum could be found at the location where R(n) is above a threshold value.

Other ways of determining the offset are to develop a theoretical model $R_0(n)$, given knowledge of the composition of the layers and approximate thickness of each layer. When R(n) is developed from 1(n), and a position P of the amplitude peak of the known R(n) is selected, the model $R_0(n)$ and the known R(n) may be used to develop and offset O, which may then be subtracted from the position P.

Figure 12:
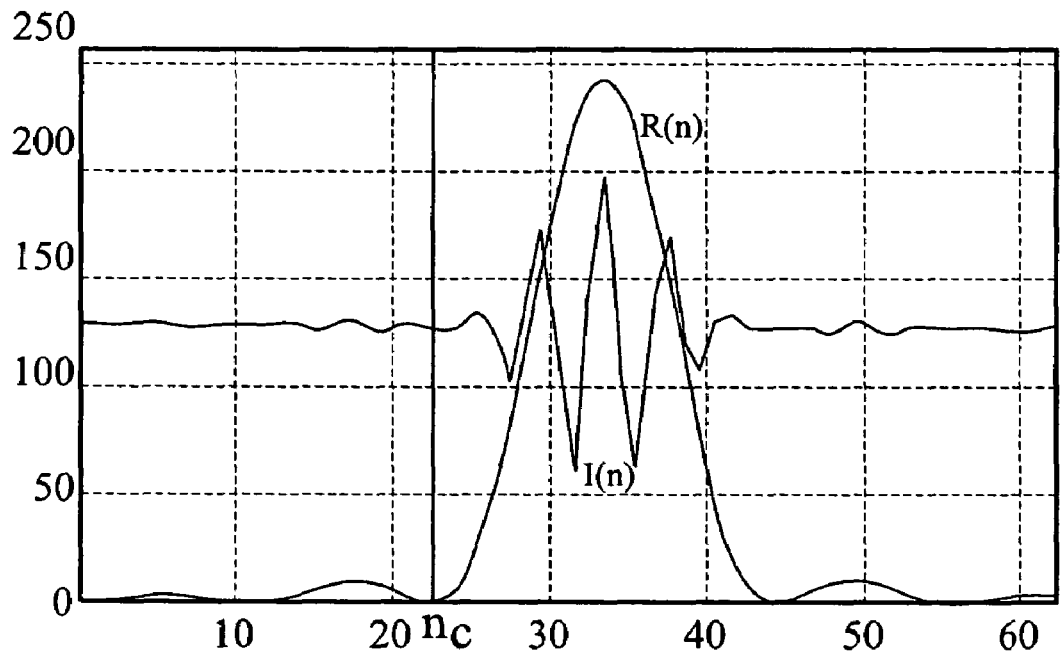
FIGS. 12 and 13 are used to explain offset calculation.
Figure 13:
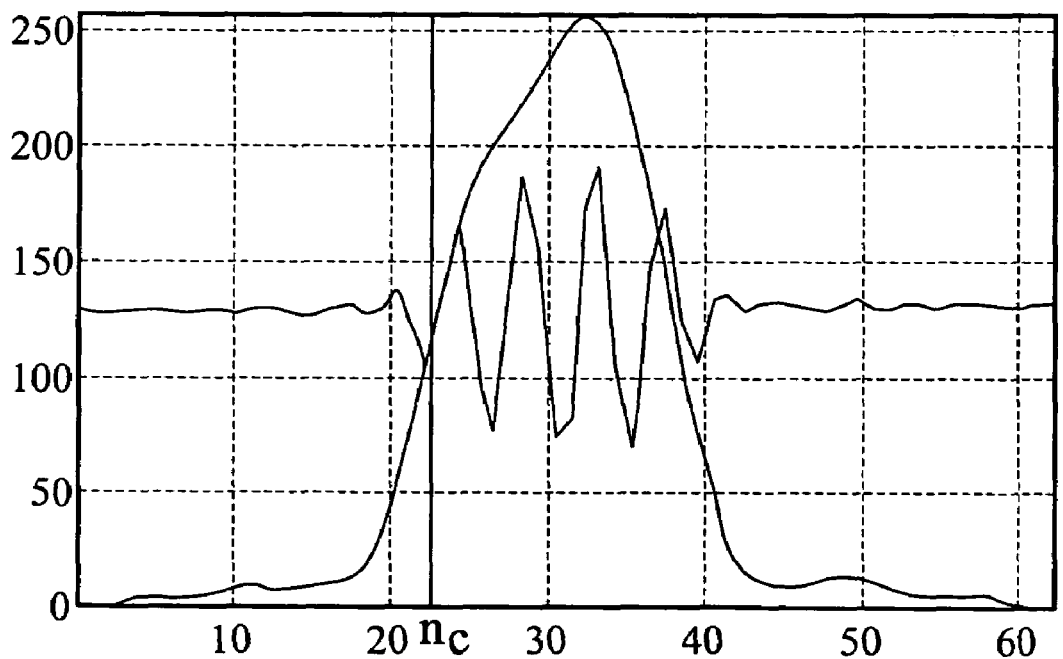

To determine the top surface calculating position n, as an offset of R(n) with known thicknesses and n&k of the transparent films, one can generate two temporal intensity distributions at a pixel by Equation (1), one with a full stack of the transparent films (see FIG. 13), the other with the same stack of the transparent films but without the top most film (see FIG. 12). Align these two intensity distributions such that the intensities at the back side of the envelopes (the right side of the envelopes of FIGS. 12 and 13) are matched. Thus, from FIG. 12, the position n, is obtained by selecting a position where R(n) is minimum or zero at the left side of the envelope R(n). The same position $n_c$ now is applied to FIG. 13. The offset distance is the distance from the position $n_c$ to the peak of R(n).

In the case of FIG. 8A, $P_A$ is selected to be the position of the amplitude peak of R(n). An offset $O_A$ is derived by the above-described modeling method, and the calculating position $n_c$ is found at the position defined by the value equal to $P_A$ minus $O_A$. In other words, $n_G$ is the location before $P_A$ that is offset from $P_A$ by the amount of the offset $O_A$. Alternatively, $n_G$ may be selected to be the location of the first amplitude peak that is greater than a threshold value. As before; the threshold value may be a constant; or it may be determined dynamically according to the maximum R(n) at each pixel.

Once $P_B$ is selected, an offset $O_B$ is derived by the above-described described modeling method, and the calculating position $n_G$ is found at the position defined by the value equal to $P_B$ minus $O_B$. In other words, $n_G$ is the location before $P_B$ that is offset from $P_B$ by the amount of the offset $O_B$. As with FIG. 8A, alternatively, $n_G$ may be found a the minimum or maximum of the phase $\Phi(n)$ within the fringe envelope R(n).

In the case of FIG. 8C, $P_c$ may be selected in the same manner as described for FIG. 8B. For purposes of illustration, $P_c$ is selected to be the location of the first amplitude peak of R(n) that is greater than a threshold value, say 150. The first amplitude peak for R(n) which exceeds an intensity of 150 is identified as $P_c$. An offset $O_c$ is derived using one of the methods above-described, and the calculating position $n_G$ is found at the position before $P_c$ that is offset from $P_c$ by the amount of the offset $O_c$. As before, alternatively, $n_G$ may be found at the minimum or maximum of the phase $\Phi(n)$ within the fringe envelope R(n).

It should be noted that, although the plots for some or all of the fringe envelopes for boundaries $m_1$, $m_2$, $m_3$ are shown in FIGS. 8A, 8B, 8C, 10 and 11, the plots are theoretically derived. However, the superposition of the theoretical plots for boundaries $m_1$, $m_2$, $m_3$ onto the graphs of the intensity distributions and their associated envelopes shown in FIGS. 8A, 8B, 8C, 10 and 11 shows that, using the invention described herein, the calculating position $n_G$ is found to be a position of the measuring surface relative to the reference surface in which all but ne of the fringe envelopes of the reflective surfaces has no amplitude.

Once the calculating position is found, the phase $\Phi(n_G)$ is extracted by:

$$\Phi(n) = \tan^{-1} \frac{\sum_{k=1}^{K} R_k(n)\sin\Phi_k(n)}{\sum_{k=1}^{K} R_k(n)\cos\Phi_k(n)}$$

Where $S_G$ and $C_i$ are the weights of the sampling intensity of the I-th frame, M is the total number of frames used in the algorithm, and K is the total number of reflective surfaces such that for $n_G$:

$$\sum_{k=2}^{k} R_k(n_c)\sin\Phi_k(n_c) = \sum_{k=2}^{K} R_k(n_c)\cos\Phi_k(n_c)$$
$$= 0 \text{ and } R_1(n_c)$$
$$\neq 0.$$

In a situation where the measuring surface has a flat top surface and has part of the measuring area where the top surface can be reliably measured, such as a surface having a portion without thin film, the reliable calculating positions over the field of view are established at the portion without the thin film. Typically, these are areas over a metal portion, such as the metallization 12 shown in FIG. 1, which produce a much brighter image (higher intensity). This then constitutes the calculating position $n_c$ for all pixels.

Another situation exists where all or part of the measuring surface has a single transparent layer of thin film, such as the wafer surface represented in FIG. 6. The position where the maximum or minimum of the fringe phase occurs in front of the maximum envelope R(n) is the calculating position $n_c$.

It is apparent that the above techniques all are substantially the same for calculating $n_c$, but they may be employed with different types of objects. For example, in measuring the top surface of a CMP pattern wafer, the technique of finding a reliable or unambiguous measuring surface, as described above, is employed. In a CMP pattern wafer, not all of the top surface is covered with a transparent thin film. Parts of the measuring surface are exposed metals, such as copper. The top surface position can be determined unambiguously at these area because of the substantially greater intensity of the intensity distribution wherever such an uncovered metal surface exists.

CMP wafers typically are covered with a very thin transparent film of a known thickness. Thus, where an exposed top metal surface position is unambiguously determined, the interferograms for the different surfaces of the thin film can be related to the interferogram for such a top surface, and unambiguously determined.

It should be noted that the phase $\Phi_1(n_c)$ found by above techniques, see Equation (8), includes $\beta_1$ (the phase change on reflection of the first reflective surface) and $\Phi_1(n_c\text{-}\tau_1)$ (the phase change of the top fringe envelope). These error sources from the top layer can be removed if the properties of thin films and surface materials are known. These properties include the complex index of refraction of the material N, where N=n+ki, and the real part n is known as the refraction index, and the imaginary part k is known as the extinction index.

In summary, the method for producing correct height information in a white light interferometer involves the steps of first acquiring N frames of data while the white light fringe pattern is scanning through the field of view with the frames having a plurality of pixels. Then, R(n) is calculated by equation (4) for every pixel. In addition, the desired top calculating positions $n_c$ are determined for every pixel. The phase $\Phi(n)$ is extracted by equation (3) or equation (5) at the desired temporal positions $n_c$. The error resulting from the envelope phase is removed; and the phase map is converted to a height map. In addition, the phase map may be unwrapped using any conventional method; and it is possible to remove the phase on reflection at each pixel if its, related material property is known. This latter step is optional and may be used if desired.

The foregoing description is to be considered illustrative and not as limiting. Various changes and modifications will occur to those skilled in the art for performing substantially the same function, in substantially the same way, to achieve substantially the same result without departing from the true a scope of the invention as defined in the appended claims.

What is claimed is:

1. A method for producing a height map for a top surface of an object having a transparent thin film that forms at least a portion of the top surface, the method comprising the steps of:

acquiring data frames of intensities of reflected light at pixel locations from the object and a separate reference surface at a series of optical path differences between the object and the separate reference surface, for each pixel location across the data frames, tabulating a dataset of the intensity at each optical path difference, calculating from the dataset for each pixel a modulation fringe envelope R(n), extracting a phase $\Phi$ for each pixel location at each optical path difference from the modulation fringe envelope, determining an offset point $n_c$ for each pixel based at least in part on determining a first position that is offset from a peak of the modulation fringe envelope by a predetermined non-zero offset, calculating a height for each pixel based at least in part on the offset point, and producing the height map of the top surface of the object based at least in part on the calculated height for each pixel.

2. The method according to claim 1 further including extracting the phase at $n_c$ by:

$$\Phi(n) = \tan^{-1} \frac{\sum_{k=1}^{K} R_k(n)\sin\Phi_k(n)}{\sum_{k=1}^{K} R_k(n)\cos\Phi_k(n)}$$

where K is a total number of reflective surfaces of the object, such that for $n_c$:

$$\sum_{k=2}^{k} R_k(n_c)\sin\Phi_k(n_c) = \sum_{k=2}^{K} R_k(n_c)\cos\Phi_k(n_c) = 0$$

and $R_1(n_c) \neq 0$.

3. A method for producing a height map for a top surface of an object having a transparent thin film that forms at least a portion of the top surface, the method comprising the steps of:

acquiring data frames of intensities of reflected light at pixel locations from the object and a separate reference surface at a series of optical path differences between the object and the separate reference surface, for each pixel location across the data frames, tabulating a dataset of the intensity at each optical path difference, calculating from the dataset for each pixel a modulation fringe envelope R(n), extracting a phase $\Phi$ for each pixel location at each optical path difference from the modulation fringe envelope, determining an offset point $n_c$ for each pixel based at least in part on:

developing a theoretical modulation fringe envelope from a known composition of layers and approximate thickness of each layer of the object, determining a position of an amplitude peak in the modulation fringe envelope, and, using the theoretical modulation fringe envelope and the modulation fringe envelope to develop an offset 0, which is subtracted from the position of the amplitude peak in the modulation fringe envelope to provide the offset point, calculating a height for each pixel based at least in part on the offset point, and producing the height map of the top surface of the object based at least in part on the calculated height for each pixel.

4. The method according to claim 3 further including extracting the phase at $n_c$ by:

$$\Phi(n) = \tan^{-1} \frac{\sum_{k=1}^{K} R_k(n)\sin\Phi_k(n)}{\sum_{k=1}^{K} R_k(n)\cos\Phi_k(n)}$$

where K is a total number of reflective surfaces of the object, such that for $n_c$:

$$\sum_{k=2}^{k} R_k(n_c)\sin\Phi_k(n_c) = \sum_{k=2}^{K} R_k(n_c)\cos\Phi_k(n_c) = 0$$

and $R_1(n_c) \neq 0$.

5. A method for producing a height map for a top surface of an object having a transparent thin film that forms at least a portion of the top surface, the method comprising the steps of:

acquiring data frames of intensities of reflected light at pixel locations from the object and a separate reference surface at a series of optical path differences between the object and the separate reference surface, for each pixel location across the data frames, tabulating a dataset of the intensity at each optical path difference, calculating from the dataset for each pixel a modulation fringe envelope R(n), extracting a phase Φ for each pixel location at each optical path difference from the modulation fringe envelope, determining an offset point $n_c$ for each pixel based at least in part on:

generating a second modulation fringe envelope at each pixel, wherein the second modulation fringe envelope represents a stack of layers substantially similar to that as present on the object, but without a top most layer, aligning the modulation fringe envelope and the second modulation fringe envelope such that they align at a right side of the envelopes, selecting, on the second modulation fringe envelope, a position where the second modulation fringe envelope is at one of a minimum and zero at the left side of the modulation fringe envelope, and selecting, on the modulation fringe envelope, the same position as the offset point, calculating a height for each pixel based at least in part on the offset point, and producing the height map of the top surface of the object based at least in part on the calculated height for each pixel.

6. The method according to claim 5 further including extracting the phase at $n_c$ by:

$$\Phi(n) = \tan^{-1} \frac{\sum_{k=1}^{K} R_k(n)\sin\Phi_k(n)}{\sum_{k=1}^{K} R_k(n)\cos\Phi_k(n)}$$

where K is a total number of reflective surfaces of the object, such that for $n_c$:

$$\sum_{k=2}^{k} R_k(n_c)\sin\Phi_k(n_c) = \sum_{k=2}^{K} R_k(n_c)\cos\Phi_k(n_c) = 0$$

and $R_1(n_c) \neq 0$.

* * * * *